United States Patent [19]

Basehore

[11] Patent Number: 4,570,260
[45] Date of Patent: Feb. 11, 1986

[54] DIGITAL TONE SIGNAL GENERATOR FOR TELEPHONY SYSTEM

[75] Inventor: Paul M. Basehore, Sanford, Fla.
[73] Assignee: Stromberg-Carlson Corporation, Lake Mary, Fla.
[21] Appl. No.: 557,239
[22] Filed: Dec. 2, 1983
[51] Int. Cl.[4] .............................................. H04J 3/12
[52] U.S. Cl. ............................................... 370/110.2
[58] Field of Search ......................... 370/110.2, 110.3; 179/84 VF

[56] References Cited

U.S. PATENT DOCUMENTS

| | | | |
|---|---|---|---|
| 3,985,965 | 10/1976 | Field et al. | 370/110.2 |
| 4,171,466 | 10/1979 | Carbrey | 370/110.2 |
| 4,390,983 | 6/1983 | Duplessis et al. | 370/110.2 |
| 4,399,535 | 8/1983 | Southard | 370/110.2 |

Primary Examiner—Douglas W. Olms
Assistant Examiner—Frank M. Scutch, III
Attorney, Agent, or Firm—Cesari and McKenna

[57] ABSTRACT

A digital tone signal generator for generating digital tone words of selected frequencies and selected cadences in a predetermined number of sequential time slots for use by a telephony system. The generator stores signals representative of each of the frequencies and, in response to a timing signal from the telephony system, generates update signals representative of the amplitudes of the tones at the time the timing signal is received. The cadence is applied to the amplitude signals to obtain the output digital tone word.

31 Claims, 6 Drawing Figures

FIG. 3A

```
                                    +---+
                                    | A |
                                    +---+
                                      |
                                      |
                                      V
    +------    STORE INITIAL VALUES IN A STATE
    |          COUNTER AND AND UPDATE COUNTER.
    |          STATE COUNTER IDENTIFIES POINTER
    |          LATCH UPDATE STATE.
    |              |
    |          +--------------->|
    |          |                V
    |          |   CONTENTS OF DELTA PORTION OF      -----+
    |          |   MEMORY IDENTIFIED BY STATE        DELTA
    |          |   COUNTER AND UPDATE COUNTER        FETCH
    |          |   ARE LOADED INTO DELTA LATCH       SUBSTATE
    |          |                |                    -----+
    |          |                |
    |          |                V
    |          |   CONTENTS OF POINTER LATCH         -----+
    |          |   IDENTIFIED BY UPDATE COUNTER AND    |
    |          |   DELTA LATCH ARE ADDED IN ADDER      |
    |          |                |                    POINTER
    |          |                |                    UPDATE
    |          |                V                    SUBSTATE
   UPDATE      |   SUM IS STORED IN SAME POINTER       |
   STATE       |   REGISTER; AND IS ALSO COUPLED       |
    |          |   TO LINEAR TABLE PORTION OF          |
    |          |   MEMORY TO OBTAIN LINEAR VALUE     ----+
    |          |                |
    |          |                |
    |          |                V                   -----+
    |          |   LINEAR VALUE IS STORED IN LINEAR  LINEAR
    |          |   LATCH CORRESPONDING TO ADDRESS    FETCH
    |          |   TRANSMITTED BY UPDATE COUNTER     SUBSTATE
    |          |                |                   -----+
    |          |                |
    |          |                V
    |          |   HAS UPDATE COUNTER REACHED
    |          |   A PREDETERMINED MAXIMUM,           YES
    |          |   INDICATING THAT ALL LINEAR      ------+
    |          |   LATCHES HAVE BEEN FILLED?             |
    |          |                |                        |
    |          |                | NO                     |
    |          |                V                        |
    |          |   INCREMENT UPDATE COUNTER              |
    |          |                |                        |
    |          +----------------+                        |
    +-----                                               |
                              +--------------------------+
                              |
                              V
                            +---+
                            | C |
                            +---+
```

FIG. 3C

```
              +---+
              ! D !
              +---+
                !
                !
                v
         ENABLE SEL A PORTION OF
         CONTROL WORD TO ADDRESS
         LINEAR LATCHES. STORE
         CONTENTS OF SELECTED LINEAR
         LATCH IN CONTROL REGISTER
                !                          PCM
                !                         FETCH
                v                        SUBSTATE
         ENABLE SEL B PORTION OF
PCM      CONTROL WORD TO ADDRESS
TONE     LINEAR LATCHES. TRANSMIT
STATE    CONTENTS OF SELECTED LINEAR
         LATCH TO ONE INPUT OF ADDER
                !
                !
                v
         ADD CONTENTS OF SAVE LATCH
         TO CONTENTS OF LINEAR LATCH
         IDENTIFIED BY SEL B PORTION
         OF CONTROL WORD.
                !
                !
                v
         STATE COUNTER ENABLES SUM TO
         ADDRESS PCM PORTION OF MEMORY
         AND LVL PORTION OF CONTROL WORD
         TO DETERMINE LVL SECTION OF
         PCM PORTION ADDRESSED
                !
                !
                v
         CONTENTS OF ADDRESSED LOCATION IN
         MEMORY ARE STORED IN PCM LATCH   -+
                !
                !
                v
         CAD MUX ENABLES ENTRY OF CAD   ----+
         REGISTER ASSOCIATED WITH TIME      !
         SLOT TO ADDRESS TONE MULTIPLEXER   !
                !                          TONE
                !                        TRANSMIT
                v                        SUBSTATE
         CONTENTS OF SELECTED LATCH ARE
         COUPLED THROUGH TONE MULTIPLEXER
         TO SHIFT REGISTER
                !
                !
                v
              +---+
              ! E !
              +---+
```

DIGITAL TONE SIGNAL GENERATOR FOR TELEPHONY SYSTEM

CROSS REFERENCE TO RELATED PATENT APPLICATION

U.S. patent application Ser. No. 06/497,667, filed May 24, 1983, in the name of Paul M. Basehore, entitled "METHOD AND APPARATUS FOR TRANSMITTING AND RECEIVING DIGITAL TONE SIGNALS", and assigned to the assignee of the present invention.

BACKGROUND OF THE INVENTION

1. Field of the Invention

The invention relates generally to the field of signal generators for generating and transmitting tone signals, and more specifically to tone signal generators which generate and transmit tone signals in digital form. The signal generator may be expeditiously used to iteratively generate digital tone words of a multiplicity of frequencies in a number of different cadences and to transmit them in defined sequential time slots for use by a telephone switching system.

2. Description of the Prior Art

In recent years, telephony systems have undergone a number of substantial changes. Although they once were entirely analog, dedicating an entire path through the switch at the central office to one telephone call, telephony systems have become almost completely digital and multiplex a number of calls onto the same lines. The telephony system includes converters for converting signals representing voice or other subscriber information between analog and digital form. The digital signals are coupled through the switch under control of digital computers. Digitizing the voice signals allows signals from several calls to be multiplexed onto the same lines, in different time slots, thereby reducing the number of lines that are required in the telephony system. Digitizing the voice signals also allows the switch to be comprised of conventional digital memories and multiplexers under control of digital computers, rather than prior electro-mechanical relays, thereby significantly enhancing the reliability of the system.

A typical telephony system includes a "tone plant" which generates a number of tone signals having precise predetermined frequencies or combinations of such frequencies. These tone signals are used for a number of purposes, including signalling to other central offices over trunk lines, internal control, and signalling ringback tones, receiver off-hook tones, and the like over the subscriber lines. Presently, in most known telephony systems, the tone plant generates these precise tone signals in analog form, and then converts them to digital form for transfer through the switch to the required trunk or subscriber line. This requires the tone plant have a separate tone generator for each tone that is generated, and an analog-to-digital converter for each tone. The analog tone generator requires circuit elements such as capacitors and inductors of predetermined values for each tone frequency. Thus, if it is desired to change the frequencies, it would be necessary to change these components, which can be a laborious task. Furthermore, as in other analog systems, the frequencies generated by the analog tone generators can vary because of power or temperature changes, or merely with the aging of the components.

Furthermore, as has been mentioned, some signalling of the tone signals that are required, for example, for signalling over trunk lines, are combinations of two of the precise frequencies by the tone plant. The telephony system thus must have a circuit for combining selected analog tone signals to generate the required signalling tone.

The aforementioned U.S. patent application Ser. No. 06/497,667 describes a digital transceiver, a portion of which generates tone signals in digital form. The tone signal generator portion of the transceiver maintains a table of amplitude values, in digital word form, at specified equi-distant intervals over one wavelength of a normalized sinusoidal signal. In response to timing and frequency control signals from the telephony system, the tone generator iteratively selects an amplitude value from the amplitude table in response to the frequency control signals and to the number of timing signals that have been received from the beginning of the transmission of the tone. Specifically, the tone generator maintains a pointer into the amplitude table which is incremented each time the table is accessed by a frequency identification value proportional to the frequency being generated. The frequency identification values are chosen so that the tone generator will step through the table at a faster rate if it is generating a tone signal of a higher frequency than if it were generating a tone signal of a lower frequency.

Since in most known telephony systems the analog voice and tone signal are converted to digital form according to a logarithmic conversion protocol, termed a "u-255" standard, the tone signal generator then converts the digital word from the amplitude table, which is termed a "linear value", into the logarithmic value. To do so, it maintains a "PCM table" (PCM standing for "pulse code modulation"). Each digital amplitude word in the amplitude table identifies a digital tone word in the PCM table, the digital tone word in the PCM table representing the conversion of the digital amplitude word by way of the u-255 standard. The digital tone word output from the PCM table is then transmitted as the output of the tone signal generator.

SUMMARY OF THE INVENTION

The instant invention is an improvement over the tone generator described in the aforementioned U.S. patent application Ser. No. 06/497,667. In brief summary, the new digital tone signal generator transmits, in a predetermined number of sequential time slots, digital tone words representing various selected frequencies and sums of these selected frequencies. The digital tone word in each time slot is transmitted according to an individually selected cadence. One cadence with which the new tone signal generator transmits the digital tone words is an on/off cadence, in which the tone signal generator alternately transmits digital tone words representing a tone of the selected frequency and digital tone words representing an idle tone word, that is, a tone word of constant amplitude or "zero" frequency. Alternatively, a cadence can be selected of alternating frequencies, iteratively transmitting digital tone words corresponding to frequency "X", for example, for a selected first period of time and then digital tone words corresponding to frequency "Y" for a selected second period of time. The digital tone words for frequency "X" are the digital tone words for the current time slot and the words for frequency "Y" are the digital tone words from the preceeding time slot. The time periods for the cadences are selectable for all of the time slots.

BRIEF DESCRIPTION OF THE DRAWINGS

The invention is pointed out with particularity in the appended claims. The above and further objects and advantages of this invention may be better understood by referring to the following detailed description taken in conjunction with the accompanying drawings, in which:

DESCRIPTION OF THE ILLUSTRATIVE EMBODIMENTS

Preliminarily, one embodiment of the digital tone signal generator disclosed herein is used in a telephony system which generates digital voice words in response to the analog voice signals every 125 microseconds. The telephony system thus generates an 8 KHz signal, which is identified herein as a BASE TM SIG base timing signal, which identifies the beginning of each 125 microsecond period. In response to the BASE TM SIG base timing signal, the new digital tone signal generator generates a predetermined number of digital tone words (in one embodiment, the predetermined number is sixteen) and sequentially transmits them serially in a like number of time slots as a TONE signal.

Figure 1:
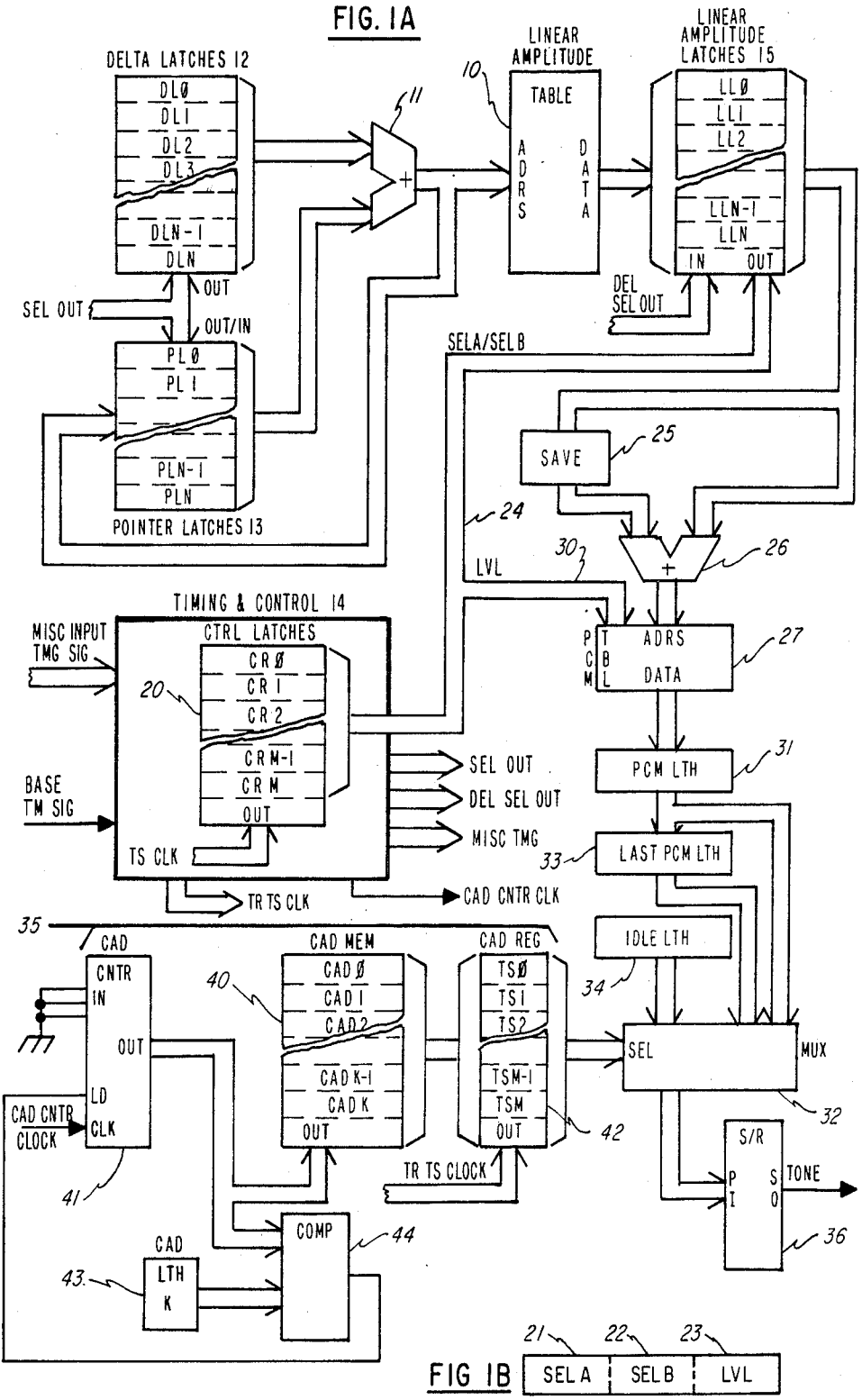
FIG. 1A is a functional block diagram of a digital tone signal generator constructed in accordance with this invention.
FIG. 1B is a diagram which is useful in understanding the tone signal generator in FIG. 1A.

FIG. 1A depicts in functional block diagram form a digital tone signal generator constructed in accordance with the invention. The digital tone signal generator includes a linear amplitude table 10 which comprises a read-only memory including a plurality of addressable storage locations. The storage locations in linear amplitude table 10 store digital amplitude words corresponding to the amplitudes of one wavelength of a normalized sinusoidal signal at a selected number of equally spaced intervals. Address terminals of linear amplitude table 10 are connected to the output of an adder 11 whose inputs are, in turn, connected to a set of delta latches 12 and a set of pointer latches 13. The delta latches 12 include latches identified as DL 0 through DL N, each of which stores a frequency indentification word which is related to one of the frequencies generated by the digital tone signal generator depicted in FIG. 1A. Pointer latches 13 include a like number of latches identified as PL 0 through PL N, each of which is associated with one of the delta latches DL 0 through DL N. In response to the receipt of the BASE TM SIG base timing signal from the telephony system, a timing and control circuit 14 generates an encoded SEL OUT select out signal which first enables the contents of delta latch DL 0 and the corresponding pointer latch PL 0 to couple their contents to the respective inputs of adder 11. The adder produces a sum which is stored in the same pointer latch in pointer latches 13 to update it, and also is coupled to the address terminals of linear amplitude table 10. The contents of the addressed location, a linear amplitude value, is stored in a linear amplitude latch LL 0 in a set of linear amplitude latches 15 to update that latch. The linear amplitude latch LL 0 is enabled to store the output from linear amplitude table 10 in response to a DEL SEL OUT delayed select out signal from timing and control circuit 14. This process of updating the pointer and linear amplitude latches is repeated until all of the linear amplitude latches receive linear amplitude values from linear amplitude table 10, the encoding of the SEL OUT selected out and DEL SEL OUT delayed select out signals being changed to appropriately identify the appropriate delta, pointer and linear amplitude latches.

By this procedure, the tone signal generator depicted in FIG. 1A obtains a digital amplitude word for all of the selected frequencies each time it receives a BASE TM SIG base timing signal from the telephony system. Each latch DL 0 through DL N in delta latches 12 contains a value representative of one of the frequencies generated by the tone signal generator. In response to the receipt of the BASE TM SIG base timing signal from the telephony system, timing and control circuit 14 enables the contents of all of the linear amplitude latches 15 to be updated with a new amplitude value. To achieve this, the timing and control circuit 14 enables the contents of the delta latches and the corresponding pointer latches to be summed through adder 11. The sums from adder 11 address linear amplitude table 10, and the amplitude values stored in the identified storage locations are stored in the corresponding linear amplitude latches, each of which is also associated with one frequency generated by the tone signal generator. Thus, in response to each base timing signal from the telephony system, the timing and control circuit 14 enables the updating of the amplitudes of all of the frequencies generated by the tone signal generator.

The value stored in each delta latch DL 0 through DL N is directly related to one of the frequencies generated by the tone signal generator. If, for example, the value stored in latch DL 0 is twice the value stored in latch DL 1, the iterative linear amplitude table addresses generated from latches DL 0 and PL 0 will sequence through the storage locations in linear table 10 twice as fast as will the addresses generated from the contents of latch DL 1 and PL 1. Accordingly, the sequence of amplitude values stored in linear amplitude latch LL 0 of linear latches 15 will represent a signal having twice the frequency as the sequence of amplitude values stored in linear amplitude latch LL 1.

After all of the linear amplitude latches 15 have been updated, the timing and control circuit 14 enables the remainder of the digital tone signal generator to generate a digital tone word for each of the output time slots. First, timing and control circuit 14 identifies one of the control words CR 0 through CR M in control latches 20. Each of the control words is associated with one of the time slots in which tone signals are transmitted by the digital tone signal generator in FIG. 1A. A TS CLK time slot clock signal generated by a clocking circuit (not shown) in timing and control circuit 14 is encoded to identify the time slot then being transmitted and enable the corresponding control word to be accessed. After all of the linear amplitude latches 15 have been updated, the timing and control circuit 14 sequentially accesses all of the control words CR 0 through CR M and generates and transmits the required digital tone words in response thereto.

The contents of each control word is illustrated in FIG. 1B. With reference to FIG. 1B, each control word includes an SEL A field 21 and an SEL B field 22. These fields identify the particular frequencies which may be combined in each time slot. Specifically, the SEL A and SEL B fields 21 and 22 identify specific ones of linear amplitude latches LL 0 through LL N in linear latches 15 which are combined during the generation of the digital tone word for the time slot corresponding to the control word. In addition, an LVL field 23 identifies the volume or amplitude level of the transmitted digital tone word as described later.

In response to a specific encoding of the TS CLK time slot clock signals, one of the control words CR 0 through CR M in control latches 20 is selected. Timing and control circuit 14 then transmits the signals from the SEL A field 21 (FIG. 1B) on SEL A/SEL B lines 24 to linear amplitude latches 15. The timing and control circuit 14 enables the contents of the linear amplitude latch identified by the SEL A field to be transmitted to and stored in a SAVE latch 25. Timing and control circuit 14 then transmits signals from the SEL B field 22 of the same control word onto lines 24. The contents of the identified linear amplitude latch are then transmitted to one input of an adder 26 and the contents of SAVE latch 15 are transmitted to the other input of adder 26. Adder 26 adds the values together, and the result is the normalized amplitude of the digital tone word for that time slot.

There are two general steps remaining in the production of the digital tone word which is transmitted in the time slot by the digital tone signal generator depicted in FIG. 1A. First, the specific telephony system in which the digital tone signal generator is used transfers digital signals which have been converted from analog form using a well-known u-255 conversion protocol. In this protocol, the digital tone signals, are converted from analog to digital form using a logarithmic protocol. The digital tone signal generator includes a PCM table 27 which stores entries for each possible sum generated by adder 26. The output of PCM table 27 is the corresponding signal according to the u-255 protocol.

As has been mentioned, the tone signal generator transmits tone signals having selectable levels or digital amplitudes. The amplitude is selected by the LVL (level) field 23 (FIG. 1B) in each of the control words CR 0 through CR M in control latches 20. Corresponding LVL level signals are transmitted on lines 30 to high order address terminals of PCM table 27. PCM table 27, in effect, includes several sub-tables, each identified by one value of the LVL level signals. The contents of corresponding locations in the sub-tables contain different volume or amplitude levels which may be transmitted based on the normalized amplitudes from the linear amplitude latches 15.

The PCM tone word output from the selected location in PCM table 27 is latched in a PCM latch 31. The contents of PCM latch 31 are then coupled to an input of an output multiplexer 32.

At this point begins the last basic step in the generation of the digital tone word, namely, the application of the selected cadence. Output multiplexer 32 selects the contents of PCM latch 32, the contents of a LAST PCM latch 33, or the contents of an idle latch 34, under control of a cadence circuit 35. The cadence circuit 35 determines, for each time slot, whether the cadence of the time slot is to be on/off or frequency "X"/frequency "Y", and also determines the timings or durations with which the "on" and "off" or the respective "X" and "Y" frequencies are to be transmitted. In the on/off cadence, during the "on" time, the output multiplexer 32 transmits the contents of the PCM latch 31 as the digital tone word to a shift register 36, which serializes the parallel signals, and transmits them as a TONE signal. During the "off" times, the contents of an IDLE latch 34 are transmitted to the shift register 36. The contents of the IDLE latch 34 represents a signal of constant amplitude, or a frequency of "zero".

In the frequency "X"/frequency "Y" cadence, the cadence circuit 35 enables multiplexer 32 to select between the contents of the PCM latch 31 and the LAST PCM latch 33. At the end of each time slot, the contents of the PCM latch 31 are shifted to the LAST PCM latch 33. Thus, the contents of the LAST PCM latch 33 are the PCM tone word for the previous time slot.

The cadence circuit 35 comprises a cadence memory 40 which contains a plurality of entries CAD 0 through CAD K. After the timing and control circuit 14 has enabled each set of M time slots to be transmitted, it enables a cadence counter 41 to increment to identify a new cadence word in cadence memory 40. The identified cadence word is then stored in a cadence register 42 to update that register. The sequence of the cadence words and the timing of the updating determines the cadence pattern, that is, timing of the transmissions of the on and off or "X" and "Y" frequency digital tone words.

Each of the cadence words CAD 0 through CAD K contains an entry for each time slot TS 0 through TS M. Each entry controls the output multiplexer 32 for the associated time slot. The entry is selected by the TR TS CLK transmit time slot clock signal from timing and control circuit 14. This signal is essentially the same as the TS CLK time slot clock signal used by timing and control circuit 14 to identify the control latch CR 0 through CR M, delayed slightly to allow the PCM tone word to be transmitted by the PCM table and latched in PCM latch 31. Cadence circuit 35 also includes a cadence latch 43 which identifies the number of cadence words CAD 0 through CAD K in cadence memory 40 and a comparator 44. When the output of cadence counter 41 equals the value stored in cadence latch 43, the comparator 44 resets cadence counter 41 to allow it to identify the CAD 0 cadence word in cadence memory 40 to cause the cadence pattern to be repeated.

In summary, FIG. 1A depicts a tone signal generator which can generate digital tone words of "N" frequencies or any combinations of these frequencies and transmit them in "M" time slots, all in response to the receipt of each BASE TM SIG base timing signal from the telephony system. The generator first updates the linear amplitude values for the frequencies, in response to the receipt of the BASE TM SIG base timing signal. For each of the M time slots the generator selectively combines the linear amplitudes, and converts them to PCM form. Finally, the generator determines the cadence applicable to the time slot, and selects an appropriate output digital tone word to be transmitted.

Figure 2:
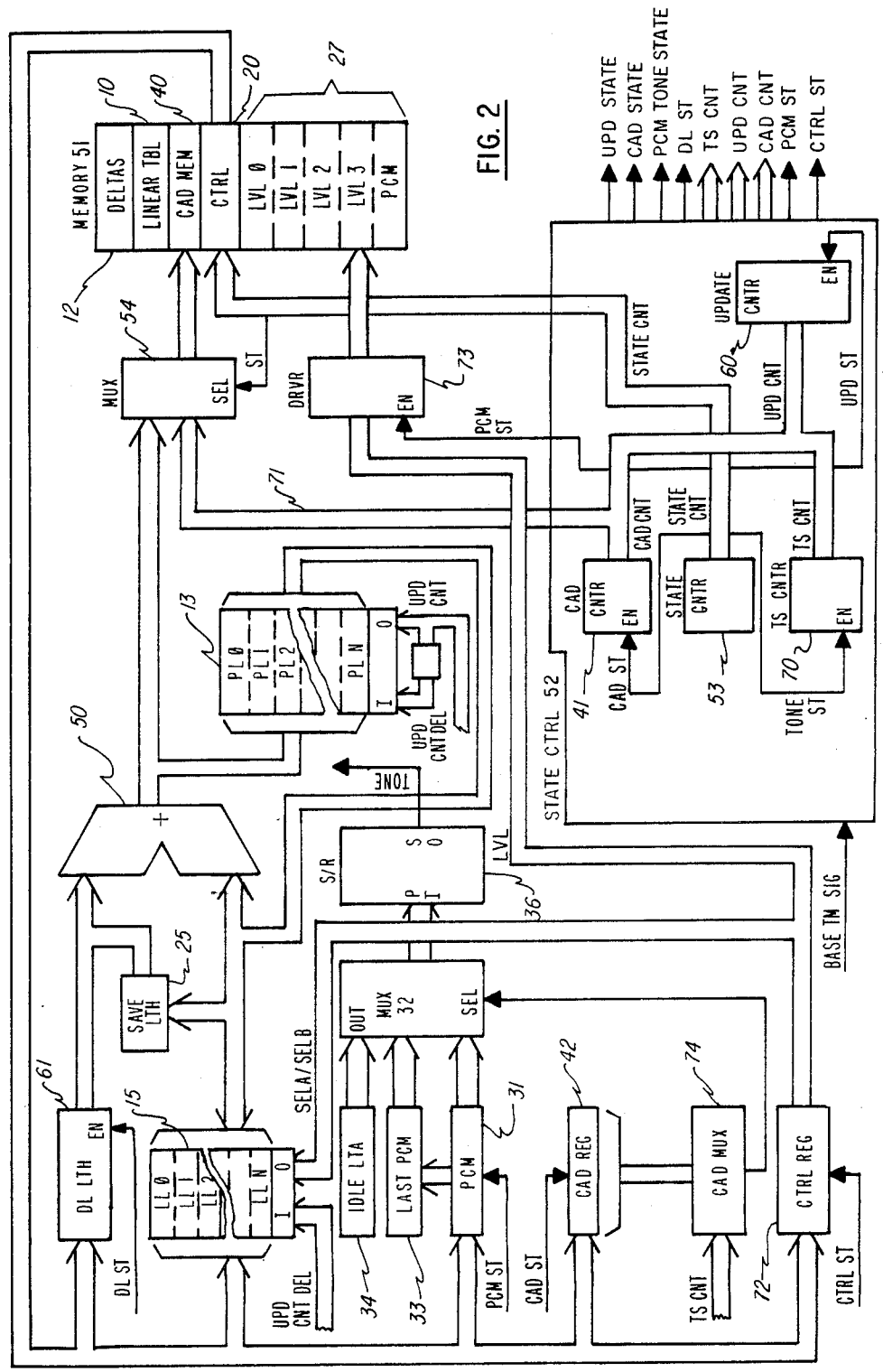
FIG. 2 is a block schematic diagram of one specific embodiment of a digital tone signal generator constructed in accordance with this invention.

It would appear from the functional block diagram of the digital tone signal generator depicted in FIG. 1A that the updating of the frequency amplitudes stored in linear amplitude latches 15 could be pipelined with the generation of the digital tone words. That is, it would appear that the step of updating the contents of the linear amplitude latches could occur contemporaneously with the generation of the digital tone words from the contents of the linear amplitude latches and the appropriate control and cadence words. However, this would generally not be desirable, since, at some point in the generation of the digital tone word, a linear amplitude latch which has not been updated would be identified by a control word. In view of this, one specific embodiment of a tone signal generator, which is depicted in FIG. 2, provides a single adder 50 which performs the functions of adders 11 and 26 (FIG. 1A) and has combined delta latches 12, the linear amplitude table 10, the cadence memory 40, control latches 20, and the PCM table 27 in a single memory 51. By providing a single memory 51, which can be implemented using a read only memory, the "programming" of the digital tone signal generator, that is, the selection of frequencies generated, the combinations of frequencies and cadences, can be altered by changing the single read only memory.

A state control circuit 52, and specifically a state counter 53, generates address and control signals that are coupled to memory 51 and that control a multiplexer 54 to enable various portions of memory 51 to be accessed. The state control 52, when it receives a BASE TM SIG base timing signal from the telephony system, identifies three general states, including (a) an update state during which the contents of all of pointer latches 13 and linear amplitude latches 15 are updated, (b) a cadence state, during which the contents of cadence register 42 is updated, and (c) a tone generation state, during which the digital tone words are generated for all of the time slots. During several of these states, there are also several sub-states, as explained below.

During the update state, state counter 53 enables an update counter 60 to increment in response to other timing signals (not shown) from state control 52. The update counter 60 transmits an UPD CNT update count signal which is transmitted onto lines 71 to one input of multiplexer 54. The state counter 53 enables the UPD CNT update count signals to be coupled to memory 51 as low-order address signals. STATE CNT state count signals from state counter 53 are coupled to memory 51 as high-order address signals which identify the delta portion 12 of memory 51. The contents of the identified location in delta portion 12 are stored in the delta latch 61 in response to a DL ST delta state signal from state control 52. Delta portion 12 of memory 51 contains an entry for each of the "N" frequencies generated by the digital tone signal generator depicted in FIG. 2. Essentially, the contents of latches DL 0 through DL N in delta latches 12 depicted in FIG. 1A are stored in memory 51, and are sequentially retrieved during the update state. The contents of the retrieved location in the delta portion is stored in delta latch 61.

The UPD CNT update count signals are also used to address pointer latches 13. The contents of the pointer latch PL 0 through PL N which is identified by the UPD CNT update count signals is coupled to one input of adder 50, and the contents of the delta latch 61 are coupled to the other input of adder 50. The sum is stored in the same pointer latch 13 in response to an UPD CNT DEL delayed update count signal. The state counter 53 then enables multiplexer 54 to couple the output of adder 50 to memory 51 as low order address signals. The STATE CNT state count output signals of the state counter 53 again comprise high order address input signals which this time enable a location in the linear amplitude table region 10 of memory 51 to be selected. The contents of the identified location in the linear amplitude table region are then coupled to the corresponding linear amplitude latch LL 0 through LL N of linear amplitude latches 15, and are stored there in response to the UPD CNT DEL delayed update count signal. This process is repeated until the contents of all of the linear latches have been updated.

After the contents of all of the linear latches 15 and pointer latches 13 have been updated, state control 52 enables state counter 53 to reset update counter 60 and to increment to the cadence state. The state counter generates a CAD ST cadence state signal which enables the cadence counter 41 to increment. The STATE CNT state count signal from state counter 53, as high order address signals, identify the cadence memory portion 40 of memory 51, and also enable multiplexer 54 to couple the CAD CNT cadence count signals from cadence counter 41 to memory 51 as low order address signals. The identified location in memory 51 is a cadence word which is coupled to cadence register 42 in response to the CAD ST cadence state signal from state control 52.

It should be noted that FIG. 2 does not illustrate the reset elements 43 and 44 (FIG. 1A). These elements have not been shown in FIG. 2, but would typically be present in state control 52 to reset cadence counter 41 after all of the cadence words have been used. This enables the cadence counter to repetitively step through the set of cadence words stored in the cadence memory portion 40.

After the linear amplitude latches 15 and cadence register 42 have been updated in response to the BASE TM SIG base timing signal, the state counter 53 identifies the third state, a "tone state" in which the digital tone word is generated and transmitted. During the tone state, the state counter 53 alternates between enabling the control portion 20 and the PCM portion 27 of memory 51. A time slot counter 70, enabled to increment by the state counter 53 in response to timing signals from circuitry (not shown) in state control 52, identifies the time slot whose digital tone word is then being generated and transmitted. The TS CNT time slot count signals from time slot counter 70 are transmitted onto low order address lines 71 to multiplexer 54. Initially, the state counter 53 transmits high order address signals which identify the control portion 20 of memory 51, and enables the multiplexer 54 to couple the signals from line 71 to memory 51 as the low order address signals. The contents of the identified location are stored in a control register 72 in response to a CTRL ST control state signal from state control 52.

As with the tone signal generator depicted in FIG. 1A, the control word includes an SEL A select frequency A field 21, an SEL B select frequency B field 22, and a LVL field 23, as illustrated in FIG. 1B. After the control word has been retrieved, the state control 52 enables the contents of the latch in linear amplitude latches 15 identified by the SEL A field 21 to be stored in SAVE latch 25. State control 52 then enables the contents of the latch identified by the SEL B field in linear latches 15 and the contents of the SAVE latch 25 to be coupled to corresponding inputs of adder 50. The state counter 53 transmits a high order address signal which identifies the PCM region 27 of memory 51, and enables multiplexer 54 to couple the output of adder 50 to memory 51 as low order address signals. State control 52 also enables a driver 73 to gate the signals from the LVL level field 23 (FIG. 1B) of the control words stored in control register 72 as intermediate order address signals. These intermediate order address signals identify one of the LVL 0 through LVL 3 portions of the PCM region 27, the contents of which are PCM values which correspond to different amplitude levels for the digital tone word to be transmitted. The low order address signals from multiplexer 54 identifies the specific location in the one of the LVL 0 through LVL 3 portions of the PCM region 27 identified by the LVL signals from driver 73. The PCM tone word from the PCM region 27 of memory 51 is stored in the PCM latch 53 in response to a PCM ST (PCM state) signal from state control 52.

The TS CNT time slot count signal from time slot counter 70 also enables a cadence multiplexer 74 to select an entry TS 0 through TS M (FIG. 1A) in the cadence word stored in cadence register 42 associated with time slot identified by the TS CNT time slot count signal. The selected entry enables the output multiplexer 32 to couple the contents of PCM latch 31, the LAST PCM latch 33, or the IDLE latch 34 to shift register 36 as the digital tone word transmitted by the digital tone signal generator for that time slot. After the contents of the selected latch have been coupled to shift register 36, the contents of PCM latch 31 are shifted to LAST PCM latch 33. Thus, if the cadence specified for the time slot by the corresponding entry in the cadence word stored in cadence register 42 is an X/Y cadence, the PCM tone word for the previous time slot is available in LAST PCM latch 33, during those times when the alternate frequency's PCM tone word is being transmitted.

The above-described process of retrieving a control word and storing it in register 72, enabling the contents of the identified latches in linear latches 15 to be summed in adder 50, using the sum to retrieve a PCM tone word from the PCM portion 27 of memory 51, and applying the appropriate cadence to generate the digital tone word, is repeated for each time slot until the contents of the time slot counter 70 reaches a predetermined value. When this has occurred, the tone signal generator has generated a digital tone word for each of the time slots. The state control 52 may then reset time slot counter 70 and state counter 53. When state control 52 receives another BASE TM SIG base timing signal from the telephony system, it will repeat the entire process from the update state.

Figure 3B:
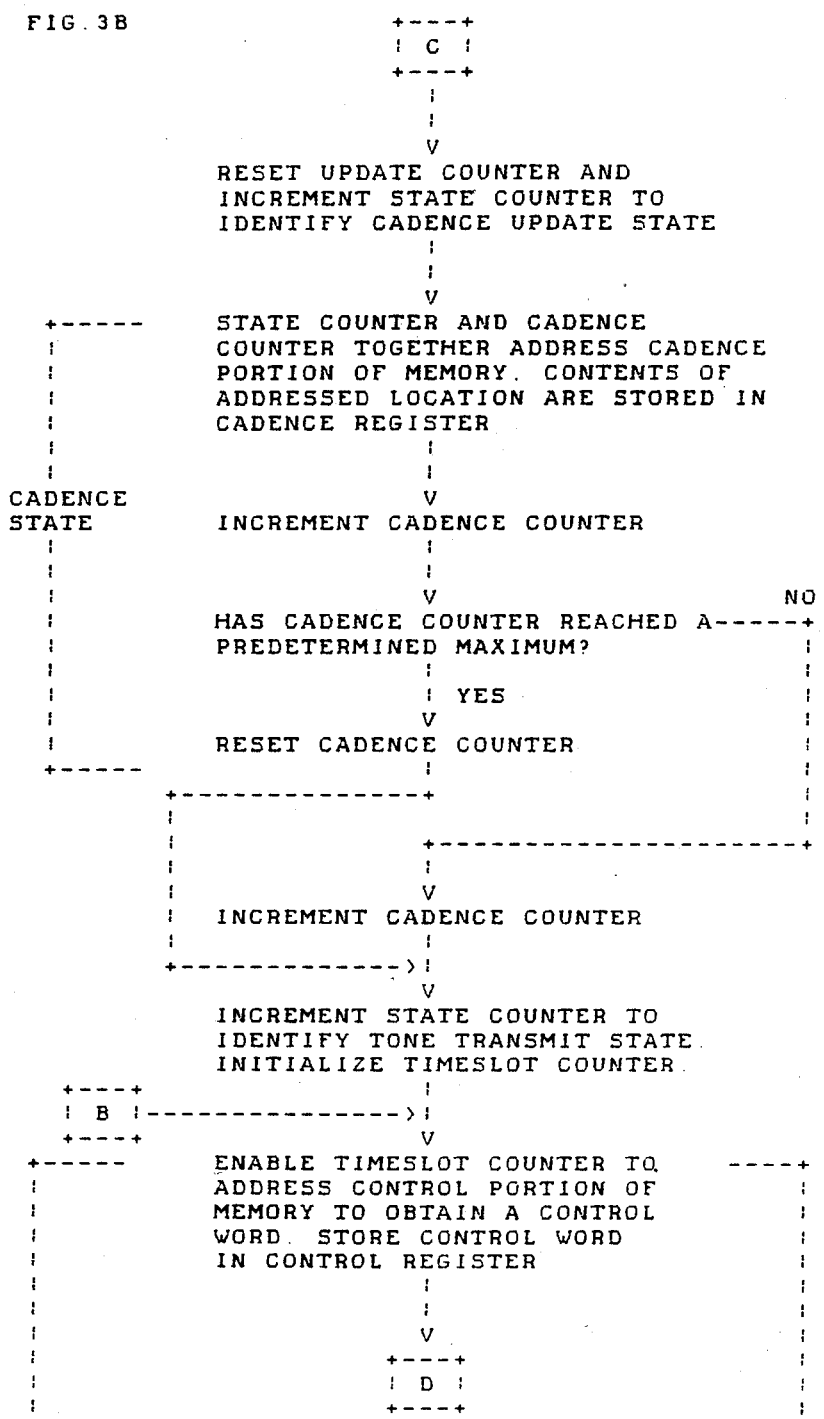
FIGS. 3A through 3C comprise flow diagrams detailing the operation of the tone signal generator depicted in FIGS. 1A and 2.
Figure 3D:
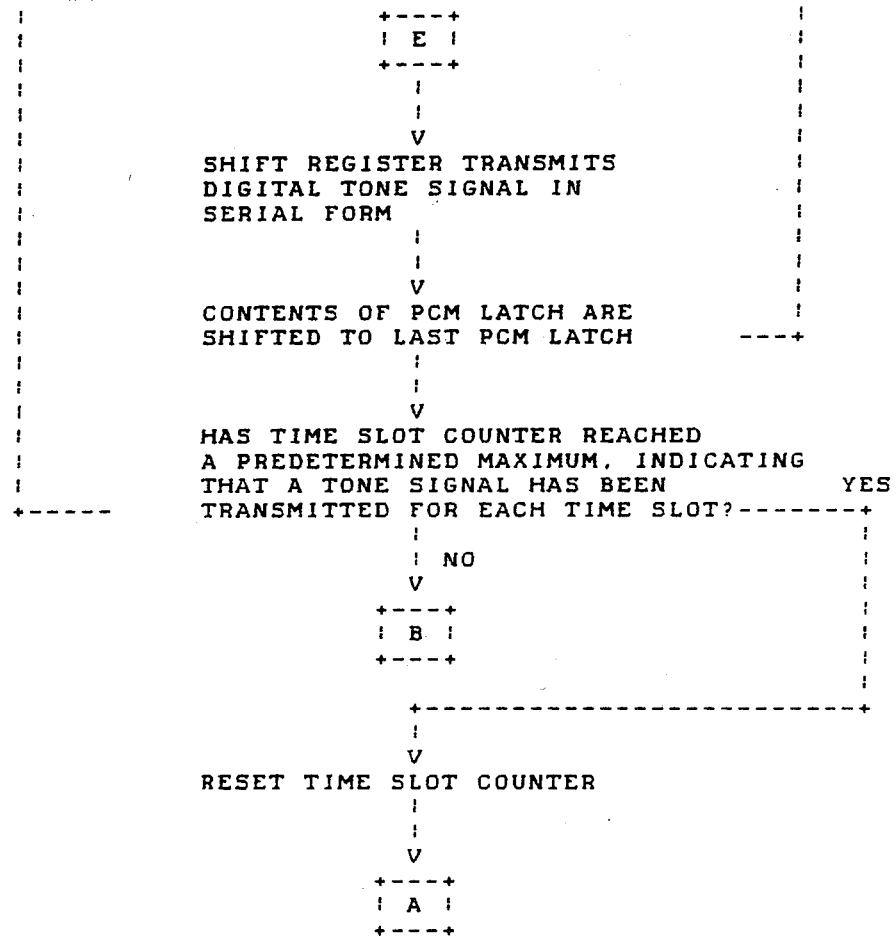

FIGS. 3A through 3C contain flow charts which describe in detail the operation of the digital signal generator depicted in FIG. 2, and identify the various states and sub-states in the procedure. The flow charts are self-explanatory, and will not be described in detail herein. However, in general, it can be seen from FIG. 3A that the update state includes three substates. In a delta fetch substate, a delta value is retrieved from memory 51. In a pointer update substate, the contents of a pointer latch PL 0 through PL N in pointer latches 13 are updated. In a linear fetch substate, the contents of linear amplitude latches LL 0 through LL N in linear latches 15 are updated. The three substates are repeated until all of the pointer latches and all of the linear amplitude latches have been updated.

The next state is the cadence state, in which a new cadence word is fetched and stored in the cadence register 42. The cadence state is also illustrated on FIG. 3A.

Finally, the PCM TONE state, which includes two substates, is depicted generally on FIGS. 3B and 3C. In the first "PCM fetch" substate, the PCM tone word is fetched. In the last substate, the digital tone word is transmitted in accordance with the appropriate time slot entry in the cadence word stored in cadence register 42. The substates of the PCM tone state are sequentially repeated until digital tone words have been generated and transmitted for all of the time slots.

After the digital tone signal generator has transmitted a digital tone word for each of the time slots, the signal generator returns to the beginning of the sequence, at FIG. 3A, to wait for the next BASE TM SIG base timing signal from the telphony system.

The foregoing description has been limited to a specific embodiment of this invention. It will be apparent, however, that the invention can be practiced in telephony systems having diverse basic construction or in systems that use different internal circuitry than is disclosed in this specification with the attainment of some or all of the advantages of the invention. Therefore, it is the object of the appended claims to cover all such variations and modifications as come within the true spirit and scope of the invention.

What is claimed as new and desired to be secured by Letters Patent of the United States is:

1. A digital tone signal generator for generating digital tone words of selected combinations of predetermined frequencies comprising:
   A. amplitude update means including:
      I. an amplitude table including a plurality of sequentially addressed storage locations for storing digital words identifying the amplitudes of a sine wave at a selected number of equal intervals, said amplitude table including address input terminals and data output terminals;
      II. means for obtaining amplitude values from said amplitude table comprising:
         (i) a plurality of frequency storage means each associated with one of said predetermined frequencies, each means for storing a frequency value representative of each of said predetermined frequencies;
         (ii) a like plurality of pointer storage means each associated with one of said predetermined frequencies, each means for storing a pointer value;
         (iii) a like plurality of amplitude storage means each associated with one of said predetermined frequencies, connected to said data output terminals of said amplitude table;
         (iv) an adder connected to said frequency storage means, said pointer storage means and said amplitude table having an input terminal connected to all of said frequency storage means, a second input terminal connected to all of said pointer storage means and an output terminal connected to said address input terminals of said amplitude table and to all of said pointer storage means; and
         (v) update control means including:
            (a) means for enabling the contents of corresponding ones of said frequency storage means and said pointer storage means to be coupled to the respective inputs of said adder and for storing the sum in the same pointer storage means, and
            (b) means for coupling the sum to said address input terminal of said amplitude storage means and for enabling the contents of the addressed location to be stored in the corresponding one of said amplitude storage means;
   B. tone word generation means connected to said storage means for receiving selected ones of the updated digital amplitude values, and for generating a digital tone word in response thereto, and C. control means connected to said amplitude update means and said tone word generation means and including means for enabling the contents of selected ones of said storage means to be coupled to said tone word generation means and means for enabling said tone word generation means to generate the digital tone word in response thereto.

2. A digital tone signal generator as defined in claim 1 wherein said tone word generation means comprises amplitude adder means having an input terminal connected to all of said amplitude storage means, a second input terminal connected to said save latch means, and an output terminal.

3. A digital tone signal generator as defined in claim 2 wherein said control means comprises:

A. control word storage means for storing a control word identifying at least one of said amplitude storage means, B. coupling means connected to said control word storage means for enabling the contents of the identified amplitude storage means to be coupled to the tone word generation means, and C. means connected to said tone word generation means for enabling it generate the digital tone word from the contents of the amplitude storage means identified by said control word.

4. A digital tone signal generator as defined in claim 3 for iteratively generating digital tone words of sequences of selected combinations of said predetermined frequencies, said control word storage means including means for storing a plurality of control words each of which identifies at least one of said amplitude storage means, said control means further including:

A. sequencing means for sequentially identifying said control words and enabling the identified control word to be used by said coupling means to enable a sequence of digital tone words to be generated during an iteration, and B. resetting means connected to said sequencing means for resetting said sequencing means after all of the control words have been used to thereby enable a further iteration to occur.

5. A digital tone generator as defined in claim 4 further comprising cadence means including:

A. means connected to said tone word generation means for storing a last digital tone word generated in response to the next previous control word in the sequence of control words while said tone word generation means is generating a current digital tone word in response to a current control word in the sequence;

B. selection means for selecting either the contents of said last digital tone word storage means or the current digital tone word for transmission as the digital tone word for the current control word.

6. A digital tone generator as defined in claim 5 wherein said cadence means further includes means for storing a constant representative of a digital tone word of constant amplitude, said selection means further including means for selecting said constant storage means, said last digital tone word storage means or the output of said tone word generation means for transmission as the digital tone word for the current control word.

7. A digital tone generator as defined in claim 6 wherein said selection means includes:

A. cadence multiplexer means connected to constant storage means, said last digital tone word storage means or the output of said tone word generation means for coupling a selected one of them therethrough as the digital tone word, and B. cadence control means for controlling the cadence multiplexer means comprising:

(i) cadence storage means for storing a sequence of cadence words for controlling said cadence multiplexer means;

(ii) cadence word retrieval means for retrieving a cadence word at the beginning of each iteration; and (iii) cadence word function means for using the cadence word to control said cadence multiplexer means.

8. A digital tone generator as defined in claim 7 wherein each cadence word includes a plurality of cadence multiplexer control entries each associated with one of said control words, said cadence control means using the multiplexer control entry associated with the control word then being used by the tone word generation means.

9. A digital tone generator as defined in claim 7 wherein said cadence word retrieval means includes cadence register means for storing the cadence word after it has been retrieved and cadence counter means for sequentially identifying cadence words in said cadence storage means and reset means for resetting said cadence counter means after all of said cadence words have been retrieved.

10. A digital tone signal generator for generating digital tone words of predetermined frequencies comprising:

A. amplitude update means comprising:

(i) amplitude table including a plurality of sequentially addressed storage locations for storing digital words identifying the amplitudes of a sine wave at a selected number of equal intervals, said amplitude table including address input terminals and data output terminals (ii) means for obtaining amplitude values from said amplitude table comprising:

(a) a plurality of frequency storage means each associated with one of said predetermined frequencies, each means for storing a frequency value representative of each of said predetermined frequencies (b) a like plurality of pointer storage means each associated with one of said predetermined frequencies, each means for storing a pointer value (c) a like plurality of amplitude storage means each associated with one of said predetermined frequencies, connected to said data output terminals of said amplitude table, (d) an adder connected to said frequency storage means, said pointer storage means and said amplitude table having an input terminal connected to all of said frequency storage means, a second input terminal connected to all of said pointer storage means and an output terminal connected to said address input terminals of said amplitude table and to all of said pointer storage means, and (e) update control means including:

(I) means for enabling the contents of corresponding ones of said frequency storage means and said pointer storage means to be coupled to the respective inputs of said adder and for storing the sum in the same pointer storage means, and
(II) means for coupling the sum to said address input terminal of said amplitude storage means and for enabling the contents of the addressed location to be stored in the corresponding one of said amplitude storage means, and
B. digital tone word generation means comprising:
i. control word storage means for storing a control word identifying at least one of said amplitude storage means;
ii. amplitude adder means having an input terminal connected to all of said amplitude storage means, a second input terminal connected to said save latch means, and an output terminal; and
iii. generation control means comprising:
(a) means connected to said save latch means and all of said amplitude storage means for enabling the contents of the identified amplitude storage means to be coupled to the input terminals of said input adder means, and
(b) means connected to said amplitude adder means for enabling it to add the values at its input terminals and transmit the sum as the digital tone word.

11. A digital tone signal generator as defined in claim 10 for iteratively generating digital tone words of sequences of selected combinations of said predetermined frequencies, said control word storage means including means for storing a plurality of control words each of which identifies at least one of said amplitude storage means, said generation control means further including:
A. sequencing means for sequentially identifying said control words and enabling the identified control word to be used by said coupling means to enable a sequence of digital tone words to be generated during an iteration, and
B. resetting means connected to said sequencing means for resetting said sequencing means after all of the control words have been used to thereby enable a further iteration to occur.

12. A digital tone generator as defined in claim 11 further comprising cadence means including:
A. means connected to said tone word generation means for storing a last digital tone word generated in response to the next previous control word in the sequence of control words while said tone word generation means is generating a current digital tone word in response to a current control word in the sequence;
B. selection means for selecting either the contents of said last digital tone word storage means or the current digital tone word for transmission as the digital tone word for the current control word.

13. A digital tone generator as defined in claim 12 wherein said cadence means further includes means for storing a constant representative of a digital tone word of constant amplitude, said selection means further including means for selecting said constant storage means, said last digital tone word storage means or the output of said tone word generation means for transmission as the digital tone word for the current control word.

14. A digital tone generator as defined in claim 13 wherein said selection means includes:
A. cadence multiplexer means connected to constant storage means, said last digital tone word storage means or the output of said tone word generation means for coupling a selected one of them therethrough as the digital tone word, and
B. cadence control means for controlling the cadence multiplexer means comprising:
(i) cadence storage means for storing a sequence of cadence words for controlling said cadence multiplexer means;
(ii) cadence word retrieval means for retrieving a cadence word at the beginning of each iteration; and
(iii) cadence word function means for using the cadence word to control said cadence multiplexer means.

15. A digital tone generator as defined in claim 14 wherein each cadence word includes a plurality of cadence multiplexer control entries each associated with one of said control words, said cadence control means using the multiplexer control entry associated with the control word then being used by the tone word generation means.

16. A digital tone generator as defined in claim 14 wherein said cadence word retrieval means includes cadence register means for storing the cadence word after it has been retrieved and cadence counter means for sequentially identifying cadence words in said cadence storage means and reset means for resetting said cadence counter means after all of said cadence words have been retrieved.

17. A digital tone signal generator for iteratively generating a sequence of digital tone words of selected combinations of predetermined frequencies comprising:
A. memory means including
i. frequency identification storage means including a plurality of addressable storage locations whose contents identify one of said predetermined frequencies;
ii. amplitude storage means including a plurality of addressable storage locations for storing digital words identifying the amplitudes of a sine wave at a selected number of equal intervals; and
iii. control word storage means including a plurality of addressable storage locations each of which stores a control word identifying the combinations of frequencies to form each digital tone word in the sequence;
B. pointer storage means including a plurality of pointer latches each of which is associated with one of said predetermined frequencies;
C. iteration amplitude storage means connected to said memory means and including a plurality of iteration amplitude latches each of which is associated with one of said predetermined frequencies;
D. control word latch means connected to said memory means for storing a control words from said control word storage means;
E. adder means connected to said memory means, pointer storage means and iteration amplitude storage means;
F. state control means connected to said memory means, pointer storage means, iteration amplitude storage means, control word latch means and adder means and including:
(i) update control means including:
(a) pointer latch update means including:
(I) means for retrieving a frequency identification from said frequency identification storage means and coupling it to one input of said adder means, and enabling the contents of the corresponding pointer latch in said pointer storage means to be coupled to the other input of said adder means; and (II) means for enabling the sum to be stored in the same pointer latch to update the pointer latch; and (b) iteration amplitude update means including:

(I) means for enabling the sum to be coupled to the memory means to identify a location in said amplitude storage means; and (II) means for enabling the contents of the identified location in said amplitude storage means to be stored in the corresponding iteration amplitude latch to update the iteration amplitude latch;

(ii) tone word control means including:

(a) means for sequentially identifying said control words from said control word storage means and for storing the identified control word in said control word latch means; and (b) means for enabling the contents of the iteration amplitude storage means corresponding to the frequencies identified in the control word in said control word latch means to be coupled to the inputs of said adder means and for enabling said adder means to add them together to form said digital tone word.

18. A digital tone signal generator as defined in claim 17 wherein said state control means further includes state sequencing means connected to said update control means and said tone word control means for enabling said update control means to update all of said pointer latches in said pointer storage means and said iteration amplitude latches in said iteration amplitude storage means prior to enabling said tone word control means to enable the retrieval of a control word from said control word storage means to enable the generation of a digital tone word.

19. A digital tone signal generator as defined in claim 18 wherein said frequency identification storage means, said amplitude storage means and said control word storage means are each identified by high-order address signals, with the storage location in each storage means being identified by low-order address signals, said sequence control means including:

A. high-order address means connected to said memory means for generating said high-order address signals for coupling to said memory means; and B. low-order address enabling means connected to said update control means, said iteration amplitude update means, and said tone word control means to enable one of (i) the sum generated by said adder means, or (ii) said control word identification, to be coupled to said memory means as low-order address signals.

20. A digital tone signal generator as defined in claim 19 further including multiplexer means having an output terminal connected to said memory means, and input terminals connected to said adder means and said control word identification means and controlled by a selection signal from said sequencing means.

21. A digital tone signal generator as defined in claim 20 wherein said sequencing means further includes means for generating high-order address signals identifying a cadence state, said digital tone signal generator further comprising cadence means comprising:

A. cadence storage means in said memory means identified by high-order address signals, said cadence storage means including a plurality of addressable storage locations for storing cadence words, each storage location being identified by a low-order address signal;

B. cadence sequencing means connected to said sequencing means for generating low-order address signals to sequentially identify said storage locations in said cadence storage means in response to the identification of a cadence state by said sequencing means; and C. cadence register means connected to said sequencing means for storing the cadence word from the identified location in said cadence storage means when said sequencing means identifies a cadence state.

22. A digital tone signal generator as defined in claim 21 wherein said sequencing means further includes means for resetting said cadence sequencing means when all of the cadence words in said cadence storage means have been identified by said cadence sequencing means.

23. A digital tone signal generator as defined in claim 21 further comprising a register for storing the output comprising the digital tone word from said adder means in response to a next previous control word while said adder means is producing a digital tone word for a current control word, said cadence means further comprising means connected to the output of said adder means and to said register for selecting either the output of said adder means or the contents of said register as the digital tone word in response to the cadence word in said cadence register means.

24. A digital tone signal generator as defined in claim 23 wherein said cadence means further comprises an idle latch for storing a constant, said idle latch being further connected to said selecting means, said selecting means selecting the contents of said idle latch, said register or the output of said adder means as the digital tone word in response to the cadence word in said cadence register means.

25. A digital tone signal generator as defined in claim 24 wherein each cadence word contains a cadence entry for controlling said selection means for each of said control words in said control word storage means, said cadence means further including entry selection means connected to said tone word control means for coupling the associated entry in the cadence word in said cadence register to the selecting means in response to the identification of the control word then being used.

26. A digital tone signal generator as defined in claim 19 wherein said memory means further includes amplitude translation storage means including a plurality of table means each including a plurality of addressable storage locations for storing amplitude levels at selected attenuation levels, each control word further including attenuation table identification means for identifying one of said table means, said state sequencing means further including means for enabling the output from said adder means to be coupled to the memory means as low-order address signals, the attenuation table identification means to be coupled to the memory means as intermediate-order address signals, and signals from said state sequencing means to be coupled to said memory means as high-order address signals to identify a location in one of said table means, the identified location's contents comprising the digital tone word.

27. A digital tone signal generator for generating digital tone words of selected combinations of predetermined frequencies comprising:

A. amplitude update means including means for generating a digital amplitude value for each of said predetermined frequencies, and storage means for storing the updated digital amplitude values for each of said predetermined frequencies, B. tone word generation means connected to said storage means for receiving selected ones of the updated digital amplitude values, and for generating a digital tone word in response thereto, and C. control means connected to said amplitude update means and said tone word generation means and including means for enabling the contents of selected ones of said storage means to be coupled to said tone word generation means and means for enabling said tone word generation means to generate the digital tone word in response thereto.

D. means connected to said tone word generation means for storing a last digital tone word while said tone word generation means is generating a current digital tone word;

E. selection means for selecting either the contents of said last digital tone word storage means or the current digital tone word for transmission as the digital tone word.

28. A digital tone generator as defined in claim 27 wherein said cadence means further includes means for storing a constant representative of a digital tone word of constant amplitude, said selection means further including means for selecting said constant storage means, said last digital tone word storage means or the output of said tone word generation means for transmission as the digital tone word for the current control word.

29. A digital tone generator as defined in claim 28 wherein said selection means includes:

A cadence multiplexer means connected to said constant storage means, said last digital tone word storage means or the output of said tone word generation means for coupling a selected one of them therethrough as the digital tone word, and B. cadence control means for controlling the cadence multiplexer means comprising:

(i) cadence storage means for storing a sequence of cadence words for controlling said cadence multiplexer means;

(ii) cadence word retrieval means for retrieving a cadence word at the beginning of each iteration; and (iii) cadence word function means for using the cadence word to control said cadence multiplexer means.

30. A digital tone generator as defined in claim 29 wherein each cadence word includes a plurality of cadence multiplexer control entries each associated with one of said control words, said cadence control means using the multiplexer control entry associated with the control word then being used by the tone word generation means.

31. A digital tone generator as defined in claim 30 wherein said cadence word retrieval means includes cadence register means for storing the cadence word after it has been retrieved and cadence counter means for sequentially identifying cadence words in said cadence storage means and reset means for resetting said cadence counter means after all of said cadence words have been retrieved.

* * * * *